United States Patent [19]

Turatti

[11] 4,198,903
[45] Apr. 22, 1980

[54] APPARATUS FOR AUTOMATICALLY SCREENING MUSHROOMS AND FOR CUTTING THEIR STEMS

[76] Inventor: Antonio Turatti, No.26/B, Viale Regina Margherita 30014, Cavarzere(Venezla), Italy

[21] Appl. No.: 929,784

[22] Filed: Jul. 31, 1978

Related U.S. Application Data

[63] Continuation of Ser. No. 755,610, Dec. 29, 1976, abandoned.

[30] Foreign Application Priority Data

Jan. 8, 1976 [IT]  Italy .............................. 12406 A/76
Sep. 3, 1976 [IT]  Italy .............................. 12780 A/76

[51] Int. Cl.² ........................................ A23N 15/04
[52] U.S. Cl. ........................................ 99/642; 99/643
[58] Field of Search ........................... 99/643, 635–642

[56] References Cited

U.S. PATENT DOCUMENTS

| | | | |
|---|---|---|---|
| 2,978,003 | 4/1961 | Benekam | 99/643 |
| 3,179,138 | 4/1965 | Norris | 99/643 |
| 3,382,903 | 5/1968 | Kibler et al. | 99/643 X |
| 3,677,315 | 7/1972 | Cox | 99/643 X |
| 3,690,049 | 9/1972 | Roberson | 99/643 X |
| 3,886,858 | 6/1975 | Evans et al. | 99/643 |

*Primary Examiner*—John M. Jillions
*Attorney, Agent, or Firm*—Haseltine, Lake & Waters

[57] ABSTRACT

The machine consists of more operative equal and independent units located side-by-side, but operated by a single motor, and each predisposed according to the screening of the mushrooms to be carried out. In each unit, the mushrooms, approximately pre-selected in the wanted size by a screening machine are discharged into a loading basin. From said basin, sequentially, the mushrooms are taken by a conveyor means and thereby conveyed up to the outcome point from the machine. During this path, the mushrooms first are self-selected at the predisposed size, and simultaneously they self-orient, or are compelled to turn to their correct positions, and then they undergo the cutting off of the terminal part of their stems.

10 Claims, 11 Drawing Figures

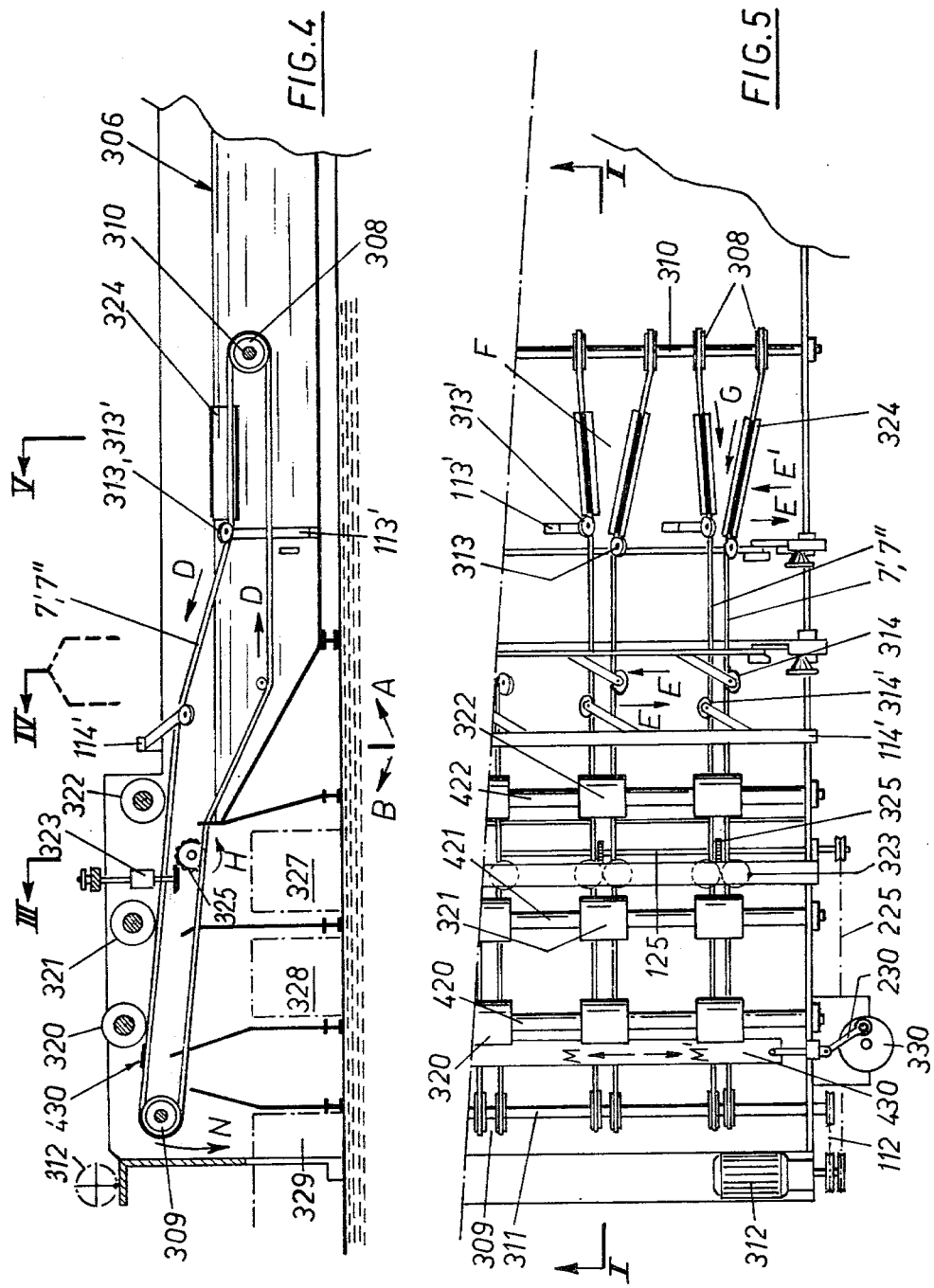

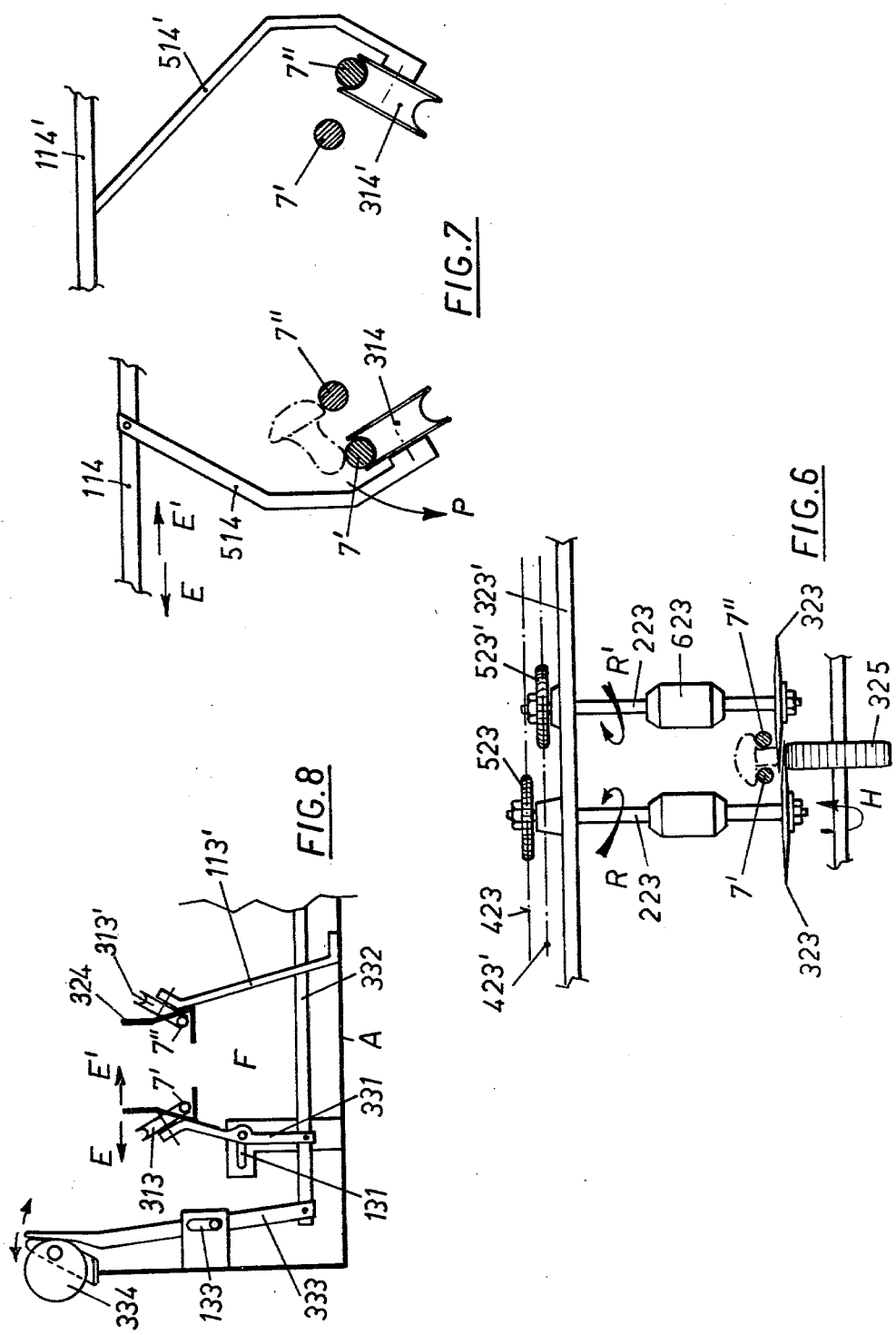

APPARATUS FOR AUTOMATICALLY SCREENING MUSHROOMS AND FOR CUTTING THEIR STEMS

This is a continuation of application Ser. No. 755,610 filed Dec. 29, 1976, abandoned.

BACKGROUND OF THE INVENTION

The present invention relates to a machine for screening automatically the mushrooms and for cutting their stems. Particularly the mushrooms are the cultivated mushrooms and the cutting operation consists in removing the end of the stem to which adhere after the uprooting, soil cloths and other similar impurities.

The purpose of this machine is that of replacing the manual operators at present destined for this service, so as to render the machine itself particularly useful in the field of the food preserve industry, as the machine, due to its functional feature as aforesaid, offers the advantage of preparing and supplying the mushrooms for the subsequent manufacturing cycles, picked out according to their various dimensions.

SUMMARY OF THE INVENTION

The machine consists of more operative equal and independent units located side-by-side, but operated by a single motor, and each predisposed according to the screening of the mushrooms to be carried out. In each unit, the mushrooms, approximately pre-selected in the wanted size by a screening machine are discharged into a loading basin. From said basin, sequentially, the mushrooms are taken by a conveyor means and thereby conveyed up to the outcome point from the machine.

During this path, the mushrooms first are self-selected at the pre-disposed size, and simultaneously they self-orient or are compelled to turn to their correct positions, and then they undergo the cutting off of the terminal part of their stems.

Other and more important features of this invention, and the advantages thereby obtained, will be clearly disclosed in the following specification with reference to the attached drawings, wherein.

IN THE DRAWINGS

FIGS. 3a–d shows in detail how the correct location and orientation of the mushrooms is obtained on the conveyor means during different stages of orientation.

FIG. 4 shows a second embodiment of the machine according to this invention, in axial sectional view;

FIG. 5 is a view from up downwards of the machine of FIG. 4;

FIGS. 6, 7 and 8 represent the sectional views taken along the planes III—III, IV—IV and V—V of FIG. 4, respectively.

DESCRIPTION OF THE INVENTION

Figure 1:
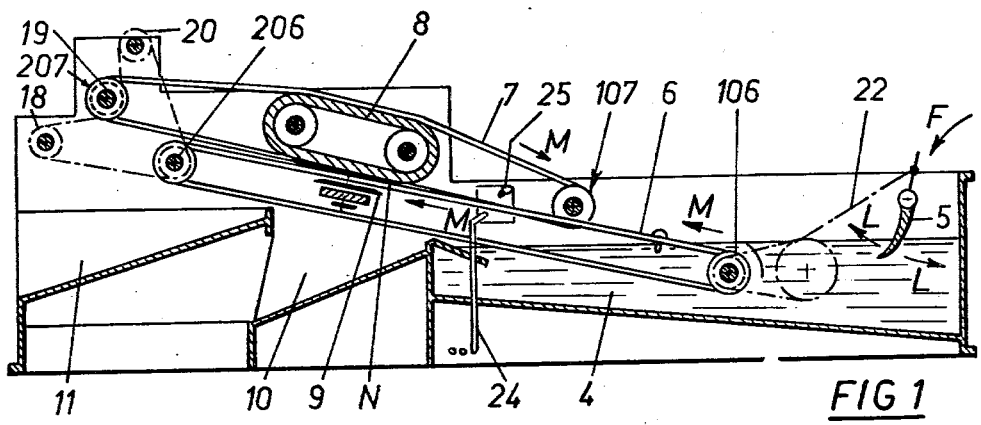
FIG. 1 shows the longitudinal axial sectional view of the machine taken along the line A—A of FIG. 2.
Figure 2:
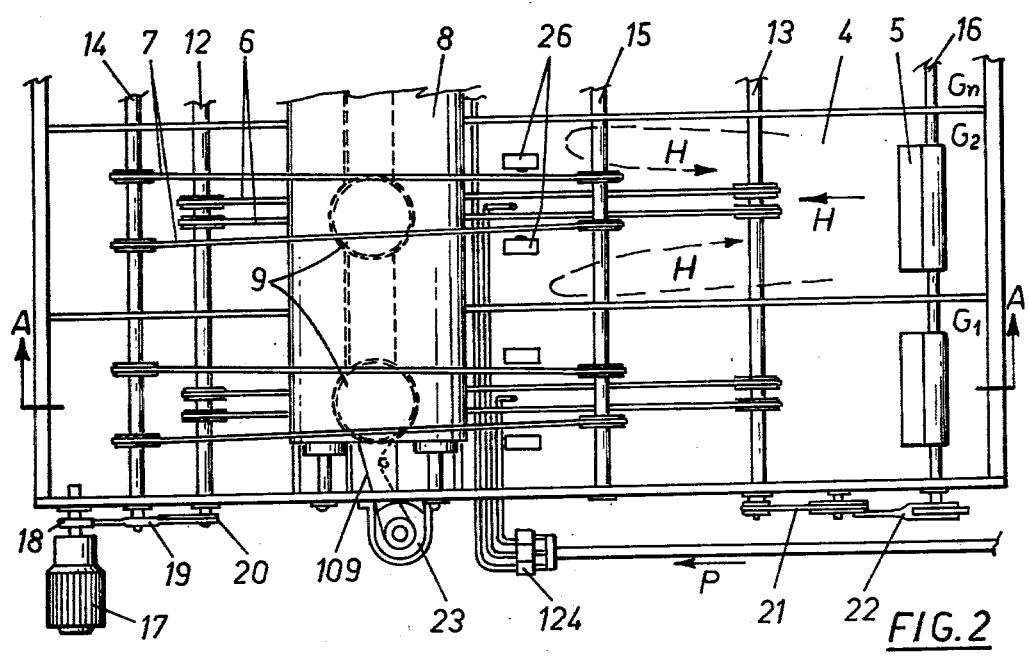
FIG. 2 is a plan view of the machine from up downwards.
Figure 3A:
Figure 3B:
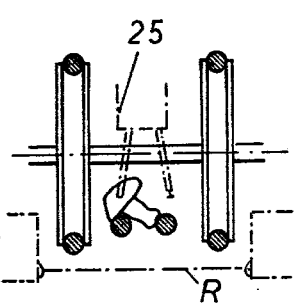
Figure 3C:
Figure 3D:
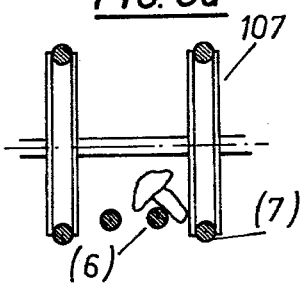

With reference to FIGS. 1 and 2, the machine consists of one or more operative units G1, G2, Gn, equal to each other and axially located side by side, but operatively independent from each other. Each unit is continuously fed with mushrooms, pre-selected by a screening machine; said mushrooms reach the respective operative unit falling (arrow F) into a basin 4 filled with water, maintained in slow reciprocatory flowing circulatory movement (arrow H) by means of a cross blade 5 oscillating (arrows L) about a pivot shaft. Said water circulation pushes the floating mushrooms towards the seizing action by an inclined conveyor member movable in a closed circuit between two run reversal pulleys, one of which 106 is immersed in water, while the other 206 is mounted projecting outside the basin, at an upper level. The conveyor member consists of a track of parallel belts 6 elastically stretched, the operative conveying and seizing plane of which moves from the low pulley 106 to the high pulley 206 (arrow M). The distance between said belts is a function of the dimensions of the mushrooms, and therefore of their pre-selection, as the mushrooms when seized, locate, usually by alone, with their head on the belts and the stems downwards turned, between the belts. A second track, consisting of equal belts 7, movable about a closed circuit, in the same direction, (arrow M) externally sides and goes along with the conveying track 6. The lower pulley 107 of this accompanying track is out of the water, but over the basin, while the upper pulley 207 projects beyond the corresponding pulley of the conveyor track 6. Further the belts of the accompanying track slightly diverge in the same plane, starting from the low pulley and are equally spaced apart from the conveyor track belts. The accompanying plane of this second track is not parallel to that of the conveyor track, as it is greatly inclined. In fact the lower pulley 107 is at a level lower with respect to the conveyor belts 6 and this divergence establishes, of course, at a certain point of the development of the planes, a theoretical cross intersection line N wherein the four belts are transversely in the same plane. Near this intersection, and through a portion of path toward the high pulley, the accompanying track 7, drives by friction a movable band 8 of soft elastic material, for instance of soft rubber, also mounted at closed circuit between the two idle rollers, mounted on the respective shafts. This band serves the function of pressing and/or holding the mushrooms present on the conveyor track, and if the case may be the mushrooms pressed between one of the belts thereof, and the continuous outer (external) belt 7 of the accompanying track. At the limit, said band can be reduced to one single roller, but in all cases it serves simultaneously all operative units G of the machine.

Downstream of the intersection N under the level of the conveying plane (belts 6) is mounted a cutting device 9, substantially a saw disc, quickly rotating.

The structure of the machine is completed by two collecting chambers one of which, denoted by 10 is located under the cutting device, while the other 11 is located under the high pulleys 206 and 207 of the tracks. Into the first chamber will fall the parts cut off of the mushroom stems, in the second chamber will fall the mushrooms to be recovered for their utilization.

For the movement of the described devices, the FIG. 2 shows how independently from the number of the operative units G, all pulleys of the run reversely are mounted on a common shaft, namely the shaft 12, for the high pulleys 206 and shaft 13 for the low pulleys 106 of the conveyor track, and shaft 14 for the high pulleys 207 and shaft 15 for the low pulleys of the accompanying track, and all stirring blades 5 are mounted on a common shaft 16. The revolution of said shafts is originated by a single motor 17 which through an outer circuit with more transmission pulleys 18, 19, 20 operates the movement (arrow N) to the tracks of the belts.

The blades 5 are oscillated as in L by an outer drive 21 for the shaft 13 and an eccentric connection 22. The cutting devices are connected to one another by a common drive 109 and rotated by a common motor 23. Concluding, all operative units operate simultaneously in parallel and each of them processes the mushrooms which are entered into the respective basins 4. In each unit, downstream of the low pulley 107 of the accompanying rack is mounted a pipe 24, which delivers when requested, a jet of pressurized air coming (arrow P) from a common pneumatic central box. The delivery spout delivers the air from the due distance, from underneath and towards the plane of the conveyor track 6, and in all cases it is within the periphery of the basin 4. The pipe 24 is intercepted by one (or more) electro-valve 124.

Over the level of the plane of the conveying belts 6, at the due distance therefrom, a feeler device 25 is mounted, which is an integrating part of an electronic monitoring box 26, photoelectrically sensitized, inserted in a circuit with the electrovalve 124 of the pneumatic circuit. The light ray of the photocell passes through both the tracks 6 and 7, immediately under the transportation plane or useful plane.

The operation: the mushrooms present in the basin 4, due to the wavey circulation H created by the stirring blades 5, enhanced also by the inclined bottom of the basin, are carried to the seizing zone, where at random they are taken sequentially by the conveyor track 6. On said track the mushrooms will be located as disclosed, and when the mushrooms will reach the intersection zone of the tracks, even if, as it will be described later on, they are located on the external race thereof, they are held stable as they are pressed by the pressing band 8, and accompanied so that the cutting device 9 will be able to cut off the end of their stem. The cut off part drops within the collecting chamber 10 for the discarded parts, and the mushrooms reach the high pulley 206 of the track so as to fall into the recovery chamber 11.

The FIG. 3 shows how the selection is carried out and how the correct conveyance position of the mushrooms is obtained. The detail B shows the mushroom which automatically locates in its correct position on the track, when seized. If the mushroom is a little one it will slide down from the belts and obviously it will fall again into the water, while if its stem is anomalous it will be located transversely with respect to the belts. The detail C shows the mushroom in its instable transverse position; due to the slight trembling movement of the belts it will unavoidably fall again into the water. In the illustrative detail D, the seized mushroom will rest transversely, but stably, on the track 6, and when reaching the low pulleys 107 of the accompanying track 7, the said pulleys, directly, or by impact on either the stem or the head will move and turn the mushroom; as the belt 7 diverges from the continuous belt 6, the mush either falls into the water, or locates in the central race 6 or in the side race 6-7, but in any cases in correct position (detail B). The cutting device can then cut off its stem, as the device operates simultaneously under the four races. If the mushroom has an anomalous size, and if it will not fall into the water, it can also remain in its stable irregular position, as shown in the detail E. For the selection, then intervenes the electronic device. It is preliminarly noted that the control device is so pre-disposed that each time a stem interrupts instantaneously the ray R of the photocell, the sensitization is not operated, but it will be energized only in one case, after the consent of the feeler 25, namely: if the felt mushroom is in correct position, the interruption of the ray does not render the photocell operative, but if the mushroom is in anomalous position, as the circuit of the photocell will not be interrupted, the monitoring box will process the consent proposed by the feeler 25. The process consists in electrically acting on the electrovalve causing it to open the pneumatic circuit. The air jet will blow away the mushroom, causing it to fall again into the basin.

All the cases of rejection of the mushrooms are only screening operations effected by the machine in the course of its operation.

The monitoring box in its unit is a known device and its connection to the electrovalve offers no novelty argument. The water basin, as far as described and illustrated, is evidently the conveying means for the mushrooms (among others, this means is suitable for a first washing stage thereof) and can be replaced and/or embodied also by other purely mechanical means. The cutting devices can be saw closed circuit band saws, or blades with a linear reciprocation, or also other various devices suitably pre-disposed. The monitoring box can also be non photoelectric, and it can consist entirely of mechanical feelers.

The FIGS. 4 to 8 show a second embodiment of the machine according to this invention, which is conceivably similar to the previously described one, however with certain constructive changes. Said changes consist of: (1) the removal of one of the two tracks of conveying belts; (2) a different solution for rejecting and screening the mushrooms when they are on the single track in irregular position, so that the feeler device is dispensed with. This different embodiment offers the great advantage of rendering unnecessary the precharging screening of the mushrooms, as the machine itself provides for screening the mushrooms at the moment when the mushrooms themselves are seized by the conveyor track. The screening can be adjusted within the entire band of the dimensions of the mushrooms; (3) the addition, if required, of a second cutting device, particularly for the big mushrooms, or for the mushrooms the stem of which is long in order to recover also the part of the stem not connected to the head; (4) predisposing in other manner the part of the machine destined to recover the mushrooms, as they are collected in three different containers; (5) rendering easier the operation of taking them from the collecting or loading container, being securely preferred the container in the form of water basin.

With reference to FIGS. 4 and 5, the machine like that previously described, consists of a load basin A for the mushrooms, containing streaming stirred water 306. Axially projecting, from said basin there is the entire part B of the machine, including the devices for cuttig the stems of the mushrooms and for recovering the parts to be discarded and those to be utilized.

The mushrooms present in the load basin, and floating on the water, are seized by a conveyor belt consisting of a track of elastic belts 7' and 7" so that the stem of the mushrooms will be pendent between the belts with the head resting on the belts. In order to increase the rate of supply, the machine includes more pairs of tracks mounted side by side, all simultaneously operating. The belts 7'-7" move in a closed circuit between a run reversal pulley 308 immersed in the water, and a counterposed pulley 309, out of the water and at an upper level. All idle low pulleys (in water) are mounted on the same idle shaft 310. The high pulleys are mounted on a common shaft 311 rotated by a motor reducer 312, through a common drive 112. On the driven shaft 310, immersed in water, the pulleys 308 of a pair of belts are suitably spaced apart, in order to space apart the belts 7'-7". On the course D, the belts of a pair, by means of an intermediate pair of pulleys 313-313' immersed in water, are caused to converge towards a second pair of intermediate pulleys 314-314' out of the water, and above the basin, in order to have the belts parallel up to the high pulleys 309. The intermediate pulleys of one of the belts, for instance the belt 7", namely the pulleys 313' and 314' have fixed positions: the first pulley on an upright 113' fixed to the bottom of the basin, and the second cited pulley on a cross bar 114'. The other pulleys 313 and 314, the pulleys related to the belt 7' can be moved transversely with respect to the machine (arrows E-E'). By displacing the pulley 314, the belt 7' will be carried to be parallel to the belt 7" (or, if wanted, a slight divergence can be obtained between the belts). By the displacement of the pulley 313, the distance which must subsist between this pulley and the non displaceable pulley 313' will be determined. This divergence, at the level of the water, forms a wedge zone F for guiding (arrow G) the mushrooms towards the point where they will be seized when the belts leave the water. The distance between the pulleys 313-313' determines, substantially, the wanted screening of the mushrooms. Obviously, the adjustment of the second idle pulley 314 depends upon the pre-fixed screening. Said wedge zone F is delimited by stationary side members 324, connected to the support means for the pulleys, in order to obtain a correct conveyance of the mushrooms. The basin is provided with the same means as already described, for streaming and stirring the water (arrow G).

In the part B of the machine, along the path of the belts 7'-7", above and transversely with respect to them, are mounted at a suitable distance the rollers 320, 321 and 322 of soft material, which bear on the head of the mushrooms, in order to hold them in engagement with the belts. Said rollers are idly mounted on respective shafts 420, 421 and 422. Also in said part B of the machine are mounted the devices for cutting the stems of the mushrooms.

If the mushrooms are big ones, or if they have a long stem, once seized from the basin, sequentially after one another and remaining engaged on the belt track 7'-7", they are submitted to two cutting operations: the first cutting operation, by the device 323, located immediately up-stream of the intermediate presser roller, removes the end of the stem in order to reject the root carrying the adherent soil and similar impurities, while the second cutting operation carried out by the device 430, located immediately downstream of the last presser roller 320, will cut the stems a little below the head. The two operations occur sequentially while the mushrooms are conveyed by the belts. The first cutting device 323 will be disclosed later on, with reference to FIG. 6, and for the moment it will be sufficient to say that it consists of a cutting member, said toothed wheel 325 located just upstream of the cutting member, said toothed wheel being slowly rotated (arrow H) in order to carry by its movement, the mushroom at the wanted level of cut. Said toothed wheel is mounted between and below the belts 7'-7" on a shaft 125 connected by the drive 225 to a prime mover 312. The second cut is carried by a saw blade 430 quickly reciprocated (arrows M and M') located crosswise under the track. The movement of the blade 430 is obtained by a connecting rod 230 eccentrically engaged on a rotating disc 330, the movement of which is caused either by an autonomous motor, or through a drive, by the main motor 312.

Under the conveying belts 7'-7" the machine is predisposed with the compartments 327-328-329 wherein are located the collecting containers. Into the first container 327 fall, after their cut, the ends to be discarded of the stem of the mushrooms. The second container 328 collects the central portion of the stem; the third container 329 collects the heads with the portion of stem, falling (arrow N) from the upper pulley 309.

In FIG. 6, the cross section III has been limited to the front illustration of the first cut device 323, of one belt track as the similar devices of the other units are entirely equal. Said device consists of two equal rotating discs 323, horizontally cutting and overlaying on one another through a portion of circle. Said discs rotate in reverse direction (arrows R and R') and operate under the belt track. Their shafts are journalled in a support stationary crossbar, 323' and are rotated by the driven chains 423-423' respectively, engaged with the toothed wheels 523-523', obviously for simultaneously moving the cutting devices of the other tracks. The rotary cutting movement of the discs 323 can be operated by a common autonomous motor, or by means of a drive connection by the main motor 312. A generic box containing antifriction bearings has been denoted by 623. The level of the toothed wheel 325 is adjusted according to the (average) characteristics of the mushroom screening; in fact by its rotational movement (arrow H) when the mushrooms present for cutting, they are taken by the wheel and lifted at the due level so that the cutting discs 323 will cut off the root of the stem. The figure clearly shows this. This first cutting device can be dispensed with if the mushrooms are little, or their stem is very short, so that it would be impossible to recover a useful portion of central stem. In this case the first cutting device will be rendered inoperative, and only the second blade cutting device 430 will be used.

FIG. 7 shows a double view uniting in a single figure the section IV taken along two vertical and close planes, and including the belt tracks 7'-7" of two operative units located side by side. In the right-hand part, the cross section shows the mounting of the pulleys 314' supported by an arm 214' rigid with the stationary cross member 114'. In the left hand part of the mounting of the pulleys 314 is shown. This mounting can be transversely adjusted as the pulleys are mounted by means of the arm 514, on a bar 114 which can be cross-wise displaced (arrows E-E') in order to pre-determine the distance between the parallel belts 7'-7", or their possible slight divergence (or convergence). In order to embody this displacement a device is provided substantially equal to that which will be described with reference to the following figure. Particularly, it is to be noted that the belts 7'-7" of each track at this point are not coplanar, but one is at a higher (lower) level than the other; while downstream of these mountings the belts are stretched in the same plane.

In FIG. 8 the sectional view taken along the line V restricted to the belt track 7'-7" closest to one side of the basin A, shows the device for the cross wise adjustment of the movable pulleys 313 with respect to the fixed position pulleys 313', which as aforesaid are mounted by an upright 113' on the bottom of the basin. Said upright arm engages also the side member 324 delimiting the wedge zone F. The pulleys 313 and their side member 324 are mounted at the upper end of the arm of a lever 331 the center of which is pivoted on a slot 131. The other arm of the lever is articulately connected on a cross-bas 332. One end of this bar is articulately connected to the arm of a second lever 333 the centre of which is pivoted in a slot 133, while the second arm thereof bears against a cam 334 (eccentric disc). The simplicity of this mechanism allows to state that by moving angularly the cam, the lever unit as described determines the simultaneous horizontal displacement of all the arms of the levers carrying the pulleys 313 (arrows E-E') and therefore the adjustment of the distance between the pulleys 313-313' (also 314-314') with the consequent narrowing or widening of the wedge zone F for conveying the mushrooms.

Operation: the mushrooms floating on the water 306, pushed by the stream, enter (arrow G) into the wedge zone F and one at the time are seized by the belt track 7'-7''. The mushrooms under a screen size (little) are not seized. The big or anomalous mushrooms and those which will not locate their stems between the belts as required will remain in unstable position, see FIG. 7, and due to the effects of the slight quiver of the belts, or due to the effect of the jolt when passing over the pulleys 314 or 314' (see FIG. 7) due to their weight will fall again (arrow P) into the basin. The difference of level between the belts 7'-7'' renders easy their fall. There are also foreseen means for enabling each belt track, after seizing the mushrooms, to be transversely inclined first in one direction and then in the other, and thereafter to continue horizontally up to the cutting devices. In this way, it is certain that the mushrooms which are not properly located between the belts fall down in the basin.

When the pulleys 313 and 314 have been passed, the mushrooms are submitted to the first cutting operation (cutting device 323) of the end of the stem falling into the container 327, then to the second cutting operation by the reciprocating saw 430, and the useful portion of the stem will fall into the container 328, while the head of the mushroom after the pulley 309 will fall into the container 329.

From the above disclosure it will be evident that into the basin can be loaded variously sized mushrooms, but only those corresponding to the pre-disposed screening will be processed by the machine. The remainder will be then processed by changing the predisposition of the screening. This operation is quick and simple, and accordingly it does not require a relevant loss of time.

The present invention has been described with specific reference to specific embodiments, but variations or changes might be adopted without departing from the scope of protection.

Having thus described the present invention, what is claimed is:

1. A machine for automatically screening mushrooms and cutting their stems employing seizing and conveying means for handling prescreened mushrooms, said machine being defined by: a loading chamber basin disposed in proximity to said seizing and conveying means, said seizing and conveying means being formed to seize previously screened mushrooms and sequentially move the mushrooms to a collecting basin; said seizing and conveying means being defined by two tracks of elastic belts movable along a closed circuit (arrow M) between reversal points and on inclined planes, a first of said tracks being the seizing and conveying track having its lower run reversal point located for receiving the mushroom immersed in water while, another reversal point being at a higher level and axially projecting beyond the limit of the basin disposed over the collecting basin, said other track being oriented on a plane slightly divergent with respect to the plane of the conveyor track, said other track having its lower reversal point disposed in a plane which at a certain point of its closed circuit intersects (N), the plane of the conveyor track, first screening of the mushrooms being effected by a portion of the belts forming the two tracks; cooperating cutting means for cutting the mushrooms; a storage chamber downstream of said cutting means for recovering the cut mushrooms; collecting chamber for collecting the discarded parts resultant from the mushroom cutting operation; and monitoring means for monitoring the conveyance of mushrooms into a correct position for cutting the mushrooms at the end of their respective stems.

2. A machine as claimed in claim 1, wherein said other track drives a movable band made of flexible and elastic material, said band serving to hold the mushrooms with a slight pressure on the conveyor track.

3. A machine as claimed in claim 1 wherein: the cutting means is a rotary disc mounted beneath both tracks of the conveying means and in correspondence with said band and being disposed over collecting chamber for receiving discarded parts of stems of mushrooms cut off by the cutting means.

4. A machine as claimed in claim 1 wherein: photocell means being provided for checking the correct position of said mushrooms on the conveyors and second screening means for screening said mushrooms, and feeler devices which are responsive to closure of an electric connection in circuit relation therewith for controlling energization of a pneumatic box, said box having a duct for sending an air blast on toward said mushrooms in order to urge said mushrooms out of the tracks into the loading basin.

5. A machine as claimed in claim 1, wherein: movement of the conveyor track and of the accompanying other track are driven by a single motor actuator through drive chain means.

6. A machine as claimed in claim 1, wherein: movement of the cutting means is imparted by a single motor actuator through drive chain means.

7. A machine for automatically screening and cutting the stems off of mushrooms comprising: a seizing and conveying means for receiving and sequentially screening mushrooms conveyed from a collecting basin having water therein; cutting means disposed in working relation to said conveying means for cutting the stems of the mushrooms; and storage chambers for receiving cut parts of the mushrooms; said means for seizing and conveying the mushrooms being comprised of at least one of a pair of belts forming a track movable (in the D direction) in two directions of movement through respective first and second drive means, said first drive means is immersed into the water of the basin (A), said second drive means axially projecting outside the basin, said belt track being guided from drive means (308) immersed in the water by first and second pairs respectively of intermediate guide pulleys the belts of the track converging toward a first of said pair of intermediate guide pulleys (313-313') and continuing in a substantially parallel direction beyond and over a second of said pair of intermediate guide pulleys up to said second drive means, means being provided for urging each belt track to a transverse inclined position and then to another inclined opposite position, whereby the mushrooms which lay in an improper position on said belt track being urged to fall back into said basin.

8. A machine as claimed in claim 7, further including means for stirring the water in the basin for pushing the mushrooms toward the tracks.

9. A machine as claimed in claim 7 wherein: portions of the belts converge and cooperate with conveying flank members for directing the mushrooms toward a point of convergence of the portions of said belts.

10. A machine as claimed in claim 7 further comprising means for adjusting the distance between the pairs of intermediate guide pulleys.

* * * * *